Feb. 21, 1961 C. W. GERHARDT 2,972,248
METHOD AND APPARATUS FOR MEASURING CORROSION RATES
Filed June 9, 1955 3 Sheets-Sheet 1
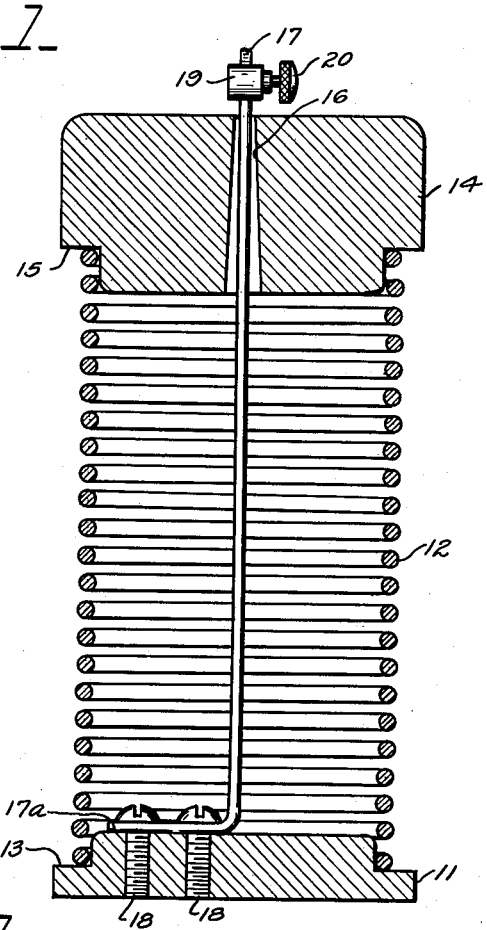
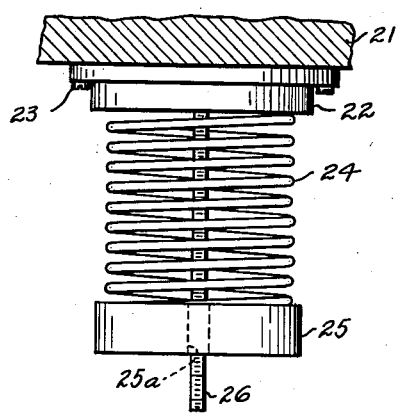
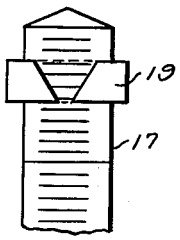
INVENTOR.
CARL W. GERHARDT
BY Wade Koontz
Lloyd B. Stevens, Jr. AND
ATTORNEYS Feb. 21, 1961  C. W. GERHARDT  2,972,248
METHOD AND APPARATUS FOR MEASURING CORROSION RATES
Filed June 9, 1955  3 Sheets-Sheet 2
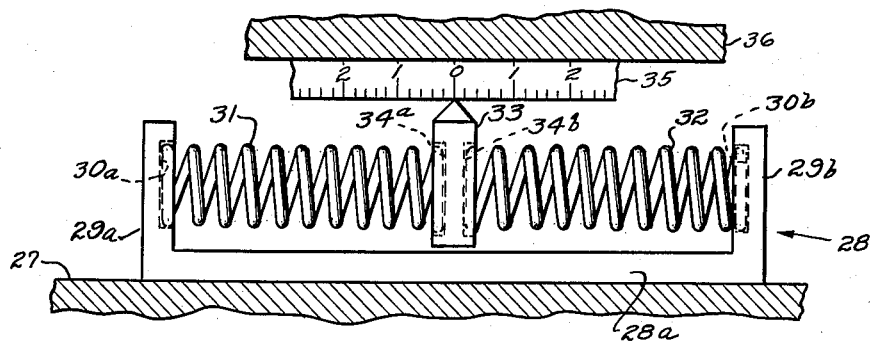
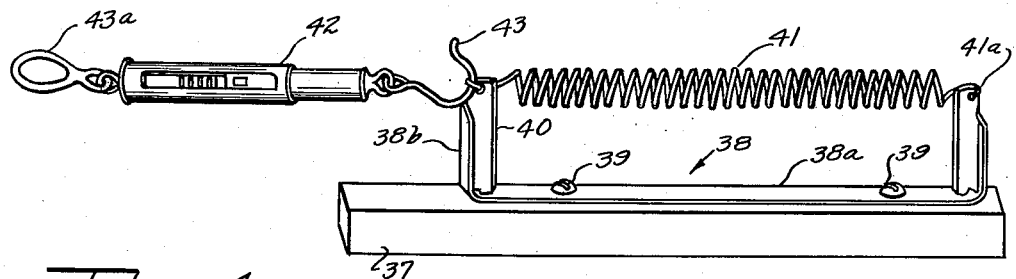
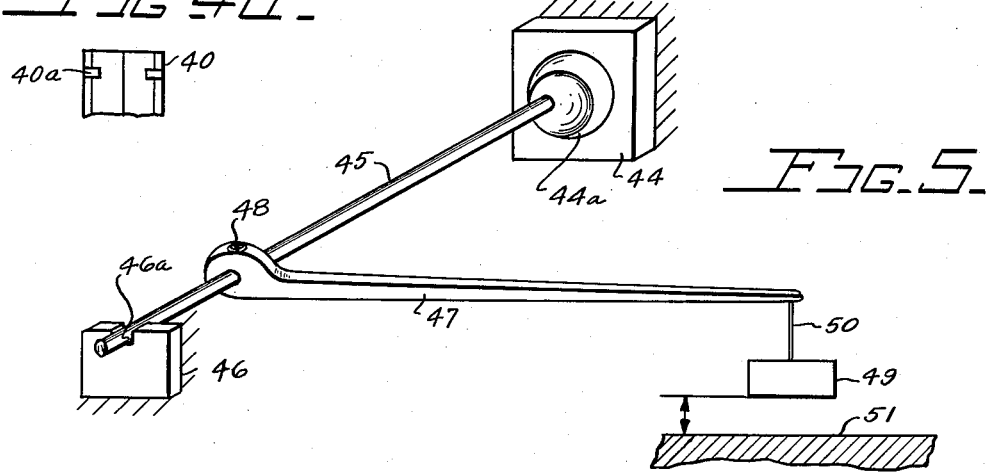
INVENTOR.
CARL W. GERHARDT
BY Wade Koontz
AND
Lloyd B. Stevens, Jr.
ATTORNEYS Feb. 21, 1961 C. W. GERHARDT 2,972,248
METHOD AND APPARATUS FOR MEASURING CORROSION RATES
Filed June 9, 1955 3 Sheets-Sheet 3

INVENTOR.
CARL W. GERHARDT
BY Wade Koontz
Lloyd B. Stevens, Jr. AND
ATTORNEYS

2,972,248

United States Patent Office

Patented Feb. 21, 1961

1

2,972,248

METHOD AND APPARATUS FOR MEASURING CORROSION RATES

Carl W. Gerhardt, 2945 Dryden Road, Dayton, Ohio

Filed June 9, 1955, Ser. No. 514,408

3 Claims. (Cl. 73—86)

(Granted under Title 35, U.S. Code (1952), sec. 266)

The invention described herein may be manufactured and used by or for the United States Government for governmental purposes without payment to me of any royalty thereon.

This invention relates to a method and apparatus for measuring the corrosivity of an atmosphere or environment or for measuring the corrodibility of a resilient member such as a spring. This invention could also be used to measure erosive rates.

The conventional method to measure corrosivity of an environment or the corrodibility of material is to prepare a test sample or samples, put them in a corrosive environment and measure the loss in weight of the samples after a fixed period of time. Such a method requires an extremely accurate balance and it has been necessary to run a large number of samples averaging results to make any reasonably accurate estimation of corrosiveness. There seem to be a number of factors that influence the accuracy of this method including the original preparation of the samples and the handling and preparation of the samples after exposure prior to weighing.

It is an object of this invention to provide an improved method and apparatus for testing corrosion rates wherein a measurement is made indicative of the change of strength of a resilient member with time as an indication of corrosive rate.

It is another object of this invention to provide an improved method and apparatus for measuring the corrosivity of an environment or an atmosphere wherein such information is obtained from a measurement indicative of the change of strength with time of the resilient member.

It is a further object of this invention to provide an improved method and apparatus for measuring the corrosion rate of a resilient materal such as a spring wherein such information is obtained from a measurement indicative of the change of strength of the resilient member.

It is yet another object of this invention to provide an improved method and apparatus for testing erosion rates wherein a measurement is made indicative of the change of strength of a resilient member with time as an indication of the erosion rate.

These and other objects of the invention will become apparent as the detailed description of the invention proceeds.

The invention will be more clearly understood from the following detailed description of specific examples thereof read in conjunction with the accompanying drawing wherein:

Fig. 1 is a sectional elevational view of one embodiment of my invention;

Fig. 1a is a partial elevational view of the scale and zero adjust means of the embodiment of Fig. 1;

Fig. 2 is an elevational view of another embodiment of my invention;

Fig. 3 is an elevational view of still another embodiment of my invention;

2

Figure 6:
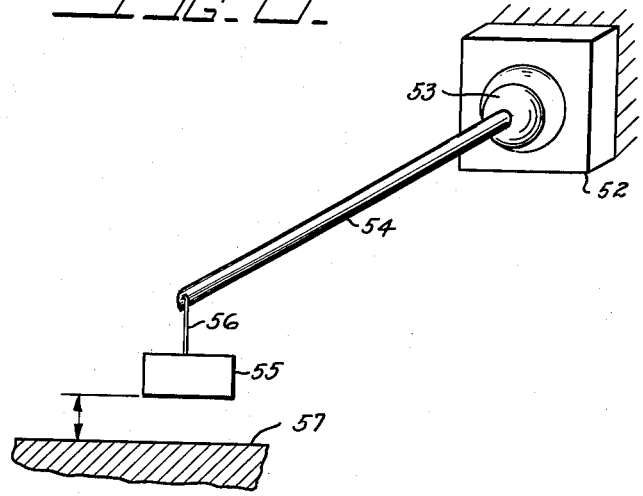
Figure 7:
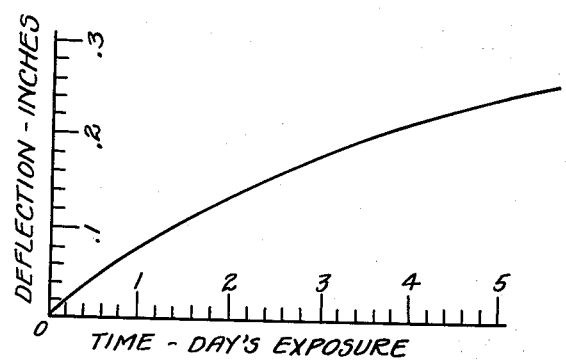

Fig. 4 is a perspective view of a fourth embodiment of my invention;

Fig. 4a is a partial elevational view of the V-shaped channel of the embodiment of Fig. 4;

Fig. 5 is a perspective view of a fifth embodiment of my invention;

Fig. 6 is a perspective view of the final embodiment of my invention; and,

Fig. 7 is a typical graphical presentation of the data obtained from an embodiment of my invention such as is shown in Fig. 1.

Fig. 1 shows a first embodiment of the apparatus of my invention. A frame 11 having a peripheral notch 13 in the top surface thereof acts as a support for the apparatus. A helical spring 12 is positioned in notch 13. Weight 14 having a peripheral notch 15 in the bottom surface thereof and an axial passage 16 therethrough is positioned on spring 12 to act as a compressive force on the spring. The spring is positioned in notch 15 of the weight. For the purpose of indicating the change in position of weight 14 a scale 17, which is L-shaped and has a bottom portion 17a as a part thereof, is attached by screws 18 or other suitable means to frame 11. This scale projects axially up through spring 12 and through passage 16 in weight 14. A zero adjust collar 19 having a set screw 20 is positioned on scale 17. Collar 19 is a split ring cylinder as shown in Fig. 1a. This arrangement facilitates the reading of the zero point.

Obviously the scale 17 need not be a part of the apparatus itself. A separate scale could be used to make the measurements. However, for convenience and accuracy it is preferred to use an attached scale. Also the zero adjust means (19 and 20) could be eliminated from the apparatus, but for convenience and accuracy it is preferred to have the zero adjust means as a part of the apparatus.

The apparatus of Fig. 1 when used is placed in the particular environment to which it is to be exposed. The zero adjust collar 19 is positioned with its bottom portion touching the top of weight 14. A reading is then made of this zero position on the scale. A number of days or weeks or months are allowed to pass and a reading is made of the scale distance between the zero adjust collar 19 and the weight 14. These readings are normally made at spaced intervals from time to time. Data obtained from these readings may be plotted in a manner similar to that shown in Fig. 7. A curve somewhat similar to that shown in Fig. 7 will be obtained. This curve is indicative of the corrosiveness of the particular environment or atmosphere in which the apparatus has been placed and of the corrodibility of spring 12. Obviously the apparatus may be used to test either the environment or the spring. The spring must be made of material which will show a measurable change in compressive strength with time in the test. Normally some sort of nonstainless steel would probably be used for the spring.

Fig. 2 shows another embodiment of my invention which is really the same embodiment as is described in Fig. 1 except that the helical spring is in tension rather than compression as in Fig. 1. This embodiment is supported from an overhead support 21. Frame 22 is attached by screws 23 or other suitable means to support 21. A helical spring 24 is rigidly attached to frame 22 by welding, brazing or other suitable means. Spring 24 could be attached to frame 22 by screwing the spring into a threaded channel (not shown) in frame 22. A weight 25 is rigidly attached to the lower end of spring 24. This weight may be attached to the spring in the same manner as the spring is attached to the frame. Weight 25 has an axial channel 25a therethrough for accommodating scale 26 which is rigidly attached to frame 22 by welding, brazing or other suitable means. As shown, scale 26 projects axially through spring 24 and weight 25.

The apparatus of Fig. 2 would be used in a method similar to that described in which the apparatus of Fig. 1 was used except that the readings in this case would be taken from the bottom of weight 25 on scale 26 and no zero adjust means would be used in this case. A reading would be taken at zero exposure time of the apparatus and at spaced time intervals during the exposure. A separate scale, i.e., not a part of the apparatus, may be used for measurements but the attached scale is preferred for convenience. In this case the change in tensile strength rather than compressive strength of the spring would be indicated. It is preferred though not absolutely necessary that all other parts except the springs of the apparatus of both Figs. 1 and 2 be made of a noncorrosive material for appearance sake, or these parts might be coated with some protective coating.

Fig. 3 shows another embodiment of my invention. This embodiment has a channel shaped frame 28 which rests on any convenient support 27, e.g., a table. Frame 28 has a base member 28a which supports the support members 29a and 29b in an upright position. Support member 29a has a circular recess 30a therein and support member 29b has a circular recess 30b therein. The openings of these two recesses face each other. A helical spring 31 is rigidly positioned in recess 30a by welding or other suitable means and a helical spring 32 is rigidly positioned in recess 30b in like manner. These springs extend toward each other and are parallel to base member 28a. A pointer 33 having circular recesses 34a and 34b therein is positioned between support members 29a and 29b. Spring is rigidly positioned in recess 34a and spring 32 is rigidly positioned in recess 34b. This arrangement puts both springs in tension pulling against one another through the link medium of pointer 33. The pointer has a sharpened upper end to facilitate reading on scale 35 which is positioned in close relation to pointer 33 and is supported by any suitable support 36. Alternatively springs 31 and 32 may be in compression against each other in which case it will not be necessary to weld or otherwise permanently fix the springs in recesses 30a, 30b, 34a and 34b.

This scale 35 may be rigidly fixed to a permanent support 36 and the apparatus positioned with the pointer opposite the zero position of the scale at the start of a test. One of the springs, e.g., spring 31, must be made of a material which will corrode with a measurable loss of strength with time. The other spring can be made of material or coated in such a fashion that it will have no appreciable loss of strength with time. Or the springs 31 or 32 may be made of different material which will corrode and lose strength at different rates. In any event to get a reading on the scale with time there must be some movement of the pointer from the zero position and this, of course, will be made possible by any one of the methods described above. Data obtained in the use of this apparatus may be plotted for best use in the manner shown in Fig. 7 or the data may be used directly in estimating corrosivity.

Fig. 4 shows a simple embodiment of my invention designed for inexpensive mass production. Because of its low cost many of these apparatus can be used in tests with averaging of the results to obtain more accurate information. The support for this apparatus may suitably be a wood or plastic support 37. This support 37 could be made of metal. Alternatively member 37 could be completely eliminated and the channel-shaped frame 38 could be used as the support for the apparatus. This frame 38 is shown in the particular embodiment attached by screws 39 to support 37. Frame 38 consists of a unitary piece having a base member 38a and two upright support members 38b positioned at the ends of 38a. V-shaped channel members 40 are rigidly attached by welding or other suitable means one to each member 38b. These V-shaped channels are positioned with their concave faces away from one another. Channels 40 do not rest on base member 38a so water will not collect in the channel causing rusting and other complications. Additional details of channels 40 are shown in Fig. 4a which is a partial elevational view looking into the concave side of the upper part of the channel 40. From this view notches 40a appear and these notches are for the purpose of retaining the ends of helical spring 41. Spring 41 is stretched between channels 40 by the hooked ends 41a of spring 41 being positioned in the notches 40a of the channels. The spring being so positioned is in tension.

In use this apparatus is first positioned in the corrosive atmosphere or environment and an initial reading of the tensile strength of the spring is made by hooking the curved end 43 of spring scale 42 around a curved end 41a of the spring. The spring scale is pulled by means of ring 43a until the scale supports the end of the spring with which it is associated. This reading taken on the spring is the initial reading of the test to be recorded. At spaced intervals of a few days, a week or more additional tensile strength readings are taken on the spring which is made of corrodible material. These readings are plotted in a fashion similar to that shown in Fig. 7, except that tensile strength in pounds or ounces would be plotted instead of deflection in inches against the time of exposure. Alternatively this data could be used directly without plotting depending on degree of accuracy desired.

Fig. 5 shows another embodiment of my invention. Resilient rod 45 capable of measurable elastic twisting is rigidly positioned in frame 44 by weld 44a or other suitable means. Rod 45 is also supported by support 46 within notch 46a at a point spaced from frame 44 with the rod being free to turn within the notch. Lever 47 is positioned on rod 45 and is rigidly attached thereto by set screw 48 or by other suitable means. A weight 49 is attached near the free-end of lever 47 by means of a wire 50 or other suitable means. This weight through the medium of lever 47 applies an appreciable twist or torsional force to rod 45.

This apparatus is used in the following fashion. A reading is taken of the distance of weight 49 above a fixed point 51 with the apparatus initially placed in the corrosive environment. In a similar fashion as with the other apparatus readings spaced with time are taken. These readings may be plotted in a manner similar to that shown in Fig. 7 or the data may be used directly.

The last detailed description of an embodiment of my invention is made with relation to Fig. 6. In this figure lever 54 is rigidly attached to support 52 by weld 53 or other suitable means. Near the end of or at a point on lever 54 spaced from support 52 a weight 55 is attached by wire 56 or other suitable means.

In using this apparatus it is first positioned in a corrosive atmosphere or environment with the weight located at a certain distance from a fixed point 57. The reading is taken of the distance between weight 55 and point 57. Then at spaced intervals of time additional readings are taken of this spacing between weight 55 and point 57. This data is used in a similar manner to that of the previous embodiments. Lever 54, of course, must be a resilient or spring-like lever which will corrode losing measurable strength with time.

As has been previously mentioned Fig. 7 shows a typical plot of data which might be obtained from the apparatus.

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. For example, the various apparatus embodiments of the invention can be used in the determination of erosive rates as well as corrosive rates, i.e., to determine the erosiveness of an environment or atmosphere or the erodibility of a resilient member. The resilient member would be made of suitable erodible material for measuring the erosiveness of an atmosphere or environment, and in many cases this material could be the same material as would be used for corrosive rate measurements. The fact that a resilient member made of the same material can in many cases be used to measure both corrosive rates and erosive rates is fortunate since sometimes an environment or atmosphere will have both corrosive and erosive properties. Accordingly modifications are contemplated which may be made without departing from the spirit of the described invention or of the scope of the appended claims.

What is claimed is:

1. A corrosion rate measuring apparatus comprising a base, a first support member extending from said base, a second support member spaced from and opposed to said first member and extending from said base, said support members being adapted to receive a corrodible helical spring stretched therebetween, said spring being made of such material that it will lose measureable tensile strength with time when placed in a corrosive environment, and calibrated means arranged to stretch said spring to the same length as said spring is stretched between said supports, whereby periodic readings may be made to determine the extent of corrosion of the corrodible spring.

2. A corrosion rate measuring apparatus comprising a base, a first support member extending from said base, a second support member spaced from and opposed to said first member and extending from said base, a first V-shaped channel member rigidly attached to said first member, a second V-shaped channel member rigidly attached to said second member, said V-shaped members having their concave surfaces facing away from each other and not extending to said base providing for the escape of water which might collect between each of said V-shaped members and the support to which said V-shaped member is attached, said V-shaped members being adapted to receive a corrodible helical spring stretched therebetween, said V-shaped member each being provided adjacent their upper end portions with notches in which the ends of the corrodible helical springs are anchored.

3. A method of measuring corrosion rates comprising the steps of placing a resilient helical coil spring member of corrodible material in a frame between a pair of uprights disposed on the ends thereof, exposing said helical coil spring member to a corrosive environment, periodically attaching a combined load applying and indicating element to one end of said member to subject said member to a tensile stress corresponding to a predetermined elongation, and checking the indications on said applying and indicating element to determine the loss of resiliency of the corrodible coil spring member attached thereto as an index of the corrosion rate of the subject environment.

References Cited in the file of this patent

UNITED STATES PATENTS

| 2,049,644 | Essen | Aug. 4, 1936 |
| 2,164,453 | Gaskins | July 4, 1939 |
| 2,568,596 | Ruge | Sept. 18, 1951 |

OTHER REFERENCES

F. A. Champion, "Corrosion Testing Procedures," Chapman & Hall (London), 1952, pages 140, 141, 340, 345 applied.

"Properties of Gas Welds," an article in Product Enginering, September 1945, pages 580 and 581.